United States Patent
Thiagarajan et al.

(10) Patent No.: US 9,333,684 B2
(45) Date of Patent: May 10, 2016

(54) METHOD OF REPAIRING, SPLICING, JOINING, MACHINING, AND STABILIZING HONEYCOMB CORE USING POURABLE STRUCTURAL FOAM AND A STRUCTURE INCORPORATING THE SAME

(71) Applicant: Bell Helicopter Textron Inc., Fort Worth, TX (US)

(72) Inventors: Ramesh Thiagarajan, Plano, TX (US); Robert Mark Chris, Dallas, TX (US); John R. McCullough, Weatherford, TX (US); Suvankar Mishra, Carrollton, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 498 days.

(21) Appl. No.: 13/663,978

(22) Filed: Oct. 30, 2012

(65) Prior Publication Data

US 2014/0120305 A1 May 1, 2014

(51) Int. Cl.
*B29C 44/18* (2006.01)
*B32B 3/12* (2006.01)
*B29C 44/56* (2006.01)
*B32B 5/18* (2006.01)
*B32B 5/24* (2006.01)
(Continued)

(52) U.S. Cl.
CPC ........... *B29C 44/186* (2013.01); *B29C 44/5627* (2013.01); *B32B 3/12* (2013.01); *B32B 5/18* (2013.01); *B32B 5/245* (2013.01); *B29L 2031/082* (2013.01); *B29L 2031/608* (2013.01); *B32B 2260/021* (2013.01); *B32B 2260/046* (2013.01); *B32B 2605/18* (2013.01); *Y10T 428/24157* (2015.01); *Y10T 428/24612* (2015.01); *Y10T 428/249953* (2015.04)

(58) Field of Classification Search
USPC ................................ 264/45.1, 46.4, 46.6, 267
See application file for complete search history.

(56) References Cited

U.S. PATENT DOCUMENTS

| | | | |
|---|---|---|---|
| 2,744,042 A | 6/1951 | Pace | |
| 3,276,784 A | 10/1966 | Anderson, Jr. | |
| 3,765,124 A * | 10/1973 | Ferris et al. | 416/226 |

(Continued)

FOREIGN PATENT DOCUMENTS

| | | |
|---|---|---|
| CN | 1163826 | 11/1997 |
| CN | 201566184 | 9/2010 |

(Continued)

OTHER PUBLICATIONS

Office Action in related U.S. Appl. No. 13/664,046, dated Jun. 27, 2014, 20 pages.

(Continued)

*Primary Examiner* — Atul P. Khare
(74) *Attorney, Agent, or Firm* — Noah A. Tevis

(57) ABSTRACT

A method of the present disclosure includes of repairing a core stiffened structure with structural foam. Another method includes splicing core members together using structural foam. Another method includes joining a core member to a structure using structural foam. Another method includes using structural foam to stabilize a core member during a machining process. Another method includes stabilizing a core member with structural foam to prevent the core member from crushing in autoclave pressure. The present disclosure further includes a core stiffened structure have a core member with structural foam therein.

10 Claims, 18 Drawing Sheets

(51) Int. Cl.
  *B29L 31/60*  (2006.01)
  *B29L 31/08*  (2006.01)

(56) References Cited

U.S. PATENT DOCUMENTS

| | | | |
|---|---|---|---|
| 3,970,324 A | | 7/1976 | Howat |
| 4,061,812 A | | 12/1977 | Gilwee, Jr. et al. |
| 4,088,723 A | * | 5/1978 | Norton ............... 264/45.5 |
| 1,124,208 A | | 11/1978 | Burns |
| 4,162,341 A | | 7/1979 | Norton |
| 4,213,739 A | | 7/1980 | Euler et al. |
| 4,268,557 A | | 5/1981 | Bracesco |
| 4,330,494 A | * | 5/1982 | Iwata et al. .............. 264/46.2 |
| 4,335,174 A | | 6/1982 | Belko |
| 4,557,961 A | | 12/1985 | Gorges |
| 4,588,626 A | | 5/1986 | Cologna et al. |
| 4,593,449 A | | 6/1986 | Meray-Hovarth et al. |
| 4,687,691 A | | 8/1987 | Kay |
| 4,714,574 A | | 12/1987 | Tenhagen |
| 4,753,836 A | | 6/1988 | Mizell |
| 4,789,304 A | | 12/1988 | Gustafson et al. |
| 4,917,742 A | | 4/1990 | Watanabe et al. |
| 4,917,747 A | | 4/1990 | Chin et al. |
| 4,956,217 A | * | 9/1990 | Heitkamp ............... 428/116 |
| 5,127,802 A | | 7/1992 | Carlson et al. |
| 5,127,861 A | | 7/1992 | Ross |
| 5,338,594 A | | 8/1994 | Wang et al. |
| 5,354,195 A | | 10/1994 | Dublinski et al. |
| 5,445,861 A | | 8/1995 | Newton et al. |
| 5,455,096 A | | 10/1995 | Toni et al. |
| 5,518,796 A | | 5/1996 | Tsotsis |
| 5,569,508 A | | 10/1996 | Cundiff |
| 5,580,502 A | * | 12/1996 | Forster et al. ............... 264/46.5 |
| 5,698,153 A | | 12/1997 | Hoopingarner et al. |
| 5,773,121 A | * | 6/1998 | Meteer et al. ............... 428/117 |
| 5,980,174 A | | 11/1999 | Gallagher et al. |
| 6,054,200 A | | 4/2000 | Woods |
| 6,298,633 B1 | | 10/2001 | McCorkle et al. |
| 6,387,200 B1 | * | 5/2002 | Ashmead et al. ............... 156/79 |
| 6,551,062 B2 | | 4/2003 | Leeke et al. |
| 6,551,441 B1 | | 4/2003 | Sato et al. |
| 6,679,969 B1 | | 1/2004 | Fournier et al. |
| 6,715,988 B2 | | 4/2004 | Leeke et al. |
| 6,740,268 B2 | | 5/2004 | Hirayama |
| 7,935,205 B2 | | 5/2011 | Bogue |
| 8,070,994 B2 | | 12/2011 | Carlson et al. |
| 2002/0014051 A1 | * | 2/2002 | Fraval et al. ............... 52/794.1 |
| 2003/0020195 A1 | | 1/2003 | Webster |
| 2003/0121596 A1 | | 7/2003 | Greven |
| 2004/0031879 A1 | | 2/2004 | Kay et al. |
| 2005/0136239 A1 | | 6/2005 | Eichinger |
| 2006/0000186 A1 | | 1/2006 | Carlson et al. |
| 2006/0137294 A1 | | 6/2006 | Waits Jr. et al. |
| 2007/0032575 A1 | * | 2/2007 | Bulluck et al. ............... 523/219 |
| 2008/0182067 A1 | | 7/2008 | Shen et al. |
| 2009/0078820 A1 | | 3/2009 | Lin et al. |
| 2009/0269547 A1 | | 10/2009 | Meyer et al. |
| 2011/0184081 A1 | * | 7/2011 | Miyamoto ............... 521/97 |
| 2011/0197367 A1 | | 8/2011 | Mossbeck |
| 2012/0114897 A1 | * | 5/2012 | Thiagarajan et al. ............ 428/71 |
| 2012/0199292 A1 | | 8/2012 | Bremmer et al. |
| 2012/0308768 A1 | * | 12/2012 | Mishra et al. ............... 428/116 |
| 2014/0106116 A1 | | 4/2014 | Bremmer et al. |

FOREIGN PATENT DOCUMENTS

| | | |
|---|---|---|
| CN | 102950820 | 3/2013 |
| DE | 2721696 A1 | 11/1978 |
| DE | 4019744 A1 | 1/1992 |
| DE | 102004005190 A1 | 8/2005 |
| EP | 0314442 A2 | 5/1989 |
| EP | 0798107 A2 | 10/1997 |
| EP | 1072396 A2 | 1/2001 |
| EP | 1184130 A1 | 3/2002 |
| EP | 1369599 A1 | 12/2003 |
| EP | 1149691 B1 | 2/2004 |
| EP | 1488919 A1 | 12/2004 |
| EP | 1245360 B1 | 12/2006 |
| EP | 1736294 | 12/2007 |
| EP | 2452793 A1 | 5/2012 |
| GB | 1153852 | 5/1969 |
| GB | 1179442 A | 1/1970 |
| GB | 1277907 A | 4/1972 |
| GB | 1338902 | 11/1973 |
| JP | 56081670 | 1/1982 |
| JP | S57212037 A | 12/1982 |
| JP | H03251329 A | 11/1991 |
| JP | 2010105455 A | 5/2010 |

OTHER PUBLICATIONS

Office Action in related U.S. Appl. No. 13/663,925, dated Jun. 1, 2014, 9 pages.
Final Office Action in related U.S. Appl. No. 13/664,046, dated Oct. 3, 2014, 20 pages.
Intention to Grant 71(3) in related European Application No. 12198672.3, dated Oct. 28, 2014, 46 pages.
European Office Action in related European Application No. 12198667.3, dated Oct. 27, 2014, 7 pages.
Canadian Office Action in related Canadian Application No. 2,831,097, dated Oct. 21, 2014, 4 pages.
Intention to Grant 71(3) in European Application 12198660.8, dated Nov. 17, 2014, 46 pages.
Intention to Grant 71(3) in European Application 12198681.4, dated Nov. 13, 2014, 47 pages.
Examination Communication in related European Application No. 12198660.8, dated Nov. 18, 2013, 5 pages.
Extended European Search Report in related European Application No. 12198672.3, dated Sep. 12, 2013, 11 pages.
Office Action and Form PTO-892 in related U.S. Appl. No. 13/664,010, dated Oct. 24, 2013, 27 pages.
Notice of Allowance in related U.S. Appl. No. 13/663,925, dated Jan. 20, 2015, 13 pages.
Office Action in related U.S. Appl. No. 13/664,010, dated Feb. 6, 2015, 21 pages.
Office Action in related U.S. Appl. No. 13/664,046, dated Jan. 9, 2015, 15 pages.
Extended European Search Report in related European Application No. 12198675.6, dated Jul. 31, 2013, 12 pages.
European Search Report in related European Application No. 12198660.8, dated May 15, 2013, 10 pages.
European Search Report in related European Application No. 12198667.3, dated Jun. 11, 2013, 10 pages.
European Search Report in related European Application No. 12198672.3, dated May 22, 2013, 8 pages.
European Search Report in related European Application No. 12198675.6, dated Jun. 3, 2013, 7 pages.
European Search Report in related European Application No. 12198681.4, dated Jun. 3, 2013, 10 pages.
Final Office Action and Form PTO-892 in related U.S. Appl. No. 13/664,010, dated Apr. 10, 2014, 19 pages.
Canadian Office Action in related Canadian Application No. 2,831,084, dated Mar. 13, 2015, 4 pages.
Canadian Office Action in related Canadian Application No. 2,831,103, dated Mar. 12, 2015, 4 pages.
Canadian Office Action in related Canadian Application No. 2,831,088, dated Mar. 18, 2015, 4 pages.
Canadian Office Action in related Canadian Application No. 2,831,098, dated Mar. 26, 2015, 4 pages.
Chinese Office Action in related Chinese Application No. 201310520882, dated May 27, 2015, 11 pages.
Chinese Office Action in related Chinese Application No. 201310520937.7, dated May 27, 2015, 13 pages.
European Office Action in related European Application No. 12198675.6, dated Jun. 9, 2015, 7 pages.
European Office Action in related European Application No. 12198667.3, dated Jun. 17, 2015, 7 pages.
European Search Report in related European Application No. 15160871, dated Jul. 8, 2015, 3 pages.

(56) References Cited

OTHER PUBLICATIONS

Office Action in related U.S. Appl. No. 13/664,046, dated Jul. 16, 2015, 14 pages.
Office Action in related Chinese Patent Application No. 201310520897.6, dated Jun. 30, 2015.
Office Action in related Chinese Patent Application No. 201310520869.4, dated Jul. 3, 2015.
Notice of Allowance in related Canadian Patent Application No. 2831097, dated Jul. 29, 2015.
Office Action in related Chinese Patent Application No. 201310522903.1, dated Aug. 6, 2015.
Office Action in related U.S. Appl. No. 13/664,046, dated Oct. 28, 2015.
Office Action in related European Patent Application No. 12198675.6, dated Nov. 11, 2015.
Notice of Allowance in related Canadian Patent Application No. 2831084, dated Nov. 12, 2015.
71(3) allowance in related European Patent Application No. 12198667.3, dated Nov. 25, 2015.
Notice of Allowance in related Canadian Patent Application No. 2831103, dated Dec. 2, 2015.
Office Action in related Canadian Patent Application No. 2831098, dated Dec. 8, 2015.
Office Action in related Canadian Patent Application No. 2831088, dated Dec. 8, 2015.
Second Office Action in related Chinese Patent Application No. 201310520869.4, dated Jan. 4, 2016.
Second Office Action in related Chinese Patent Application No. 201310520882.X, dated Feb. 2, 2016.
Second Office Action in related Chinese Patent Application No. 201310520937.7, dated Feb. 2, 2016.
Second Office Action in related Chinese Patent Application No. 201310522903.1, dated Feb. 22, 2016.
Second Office Action in related Chinese Patent Application No. 201310520897.6, dated Feb. 24, 2016.
Office Action in related U.S. Appl. No. 13/664,046, dated Mar. 16, 2016.
Office Action in related U.S. Appl. No. 13/663,954, dated Feb. 19, 2016.

\* cited by examiner

METHOD OF REPAIRING, SPLICING, JOINING, MACHINING, AND STABILIZING HONEYCOMB CORE USING POURABLE STRUCTURAL FOAM AND A STRUCTURE INCORPORATING THE SAME

BACKGROUND

1. Technical Field

One method of the present disclosure relates to using a pourable structural foam in the repair of a honeycomb core stiffened structure. Another method of the present disclosure relates to the splicing of honeycomb core using pourable structural foam. Another method of the present disclosure relates to the joining of honeycomb core to a structural with the use of structural foam. Another method of the present disclosure relates to using structural foam to provide stability to honeycomb core during a machining process. One apparatus of the present disclosure includes a core stiffened structure. Another method of the present disclosure relates to the utilization of structural foam for the stabilizing of honeycomb core during an autoclave curing cycle.

2. Description of Related Art

In a conventional repair process, a damaged core stiffened structure is repaired by removal/replacement of the damaged honeycomb core with new honeycomb core. Such a process can be expensive, time-consuming, and can require multiple curing and bonding processes. There is a need for an improved method of repairing a honeycomb core stiffened structure.

In a conventional honeycomb core splicing process, exposed cell walls are meticulously bonded to adjacent exposed cell walls of another honeycomb core with an adhesive. Such a process can be expensive, time-consuming, and can require an adhesive cure cycle. Further, such a conventional process can be inadequate for splicing honeycomb core members having non-compatible materials. There is a need for an improved method of splicing portions of honeycomb core.

In a conventional honeycomb core joining process, exposed cell walls are joined to adjacent structure with an adhesive. Such a process can be expensive, time-consuming, and require an adhesive cure cycle. There is a need for an improved method of joining honeycomb core to adjacent structure.

In a conventional honeycomb core machining process, the honeycomb core is machined to a desired contour at a feed rate low enough to prevent damage to the unstable honeycomb core. Such a process can be time-consuming. There is a need for an improved method of machining honeycomb core, especially for large cell carbon prepreg core.

In a conventional curing cycle of the honeycomb core stiffened structure, the autoclave pressure can cause the honeycomb core to crush unless a low bevel angle on the honeycomb core is used. Conventionally, if the geometry of the core stiffened panel did not allow for the low angle bevel, then the core stiffened panel would have to be manufacturing using labor intensive and procedures (multiple cure cycles) that can also add significant weight penalties. Hence there is a need for improved method of stabilizing honeycomb core during an autoclave cure cycle.

DESCRIPTION OF THE DRAWINGS

The novel features believed characteristic of the methods and apparatuses of the present disclosure are set forth in the appended claims. However, each method and apparatus, as well as a preferred mode of use, and further objectives and advantages thereof, will best be understood by reference to the following detailed description when read in conjunction with the accompanying drawings, wherein:

DETAILED DESCRIPTION

Illustrative embodiments of the methods and apparatuses are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
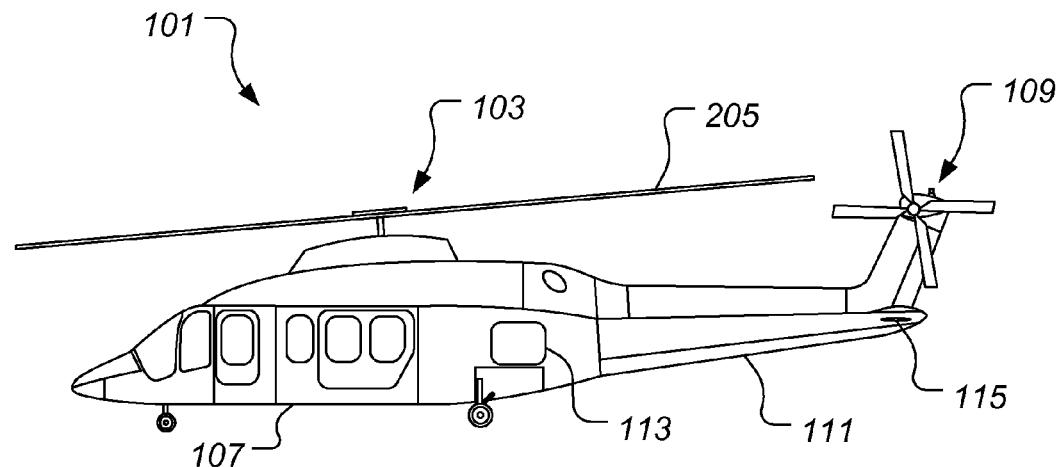
FIG. 1 is a side view of a illustrative rotorcraft.

Referring now to FIG. 1 in the drawings, a rotorcraft 101 is illustrated. Rotorcraft 101 has a rotor system 103 with a plurality of rotor blades 205. The pitch of each rotor blade 205 can be manipulated in order to selectively control direction, thrust, and lift of rotorcraft 101. Rotorcraft 101 can further include a fuselage 107, anti-torque system 109, and an empennage 111. A variety of members on rotorcraft 101 can be manufacturing as a core (honeycomb, foam, or honeycomb/foam) stiffened structure, as discussed further herein.

Figure 2:
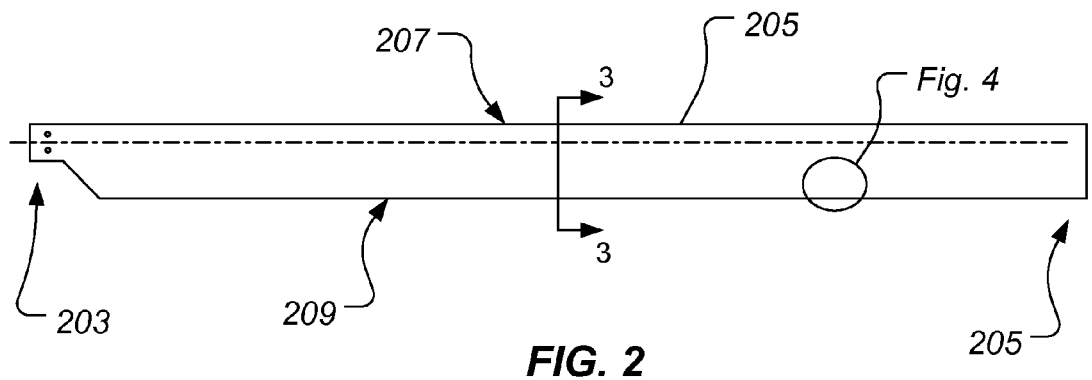
FIG. 2 is a top view of a rotor blade, according to an illustrative embodiment.
Figure 3:
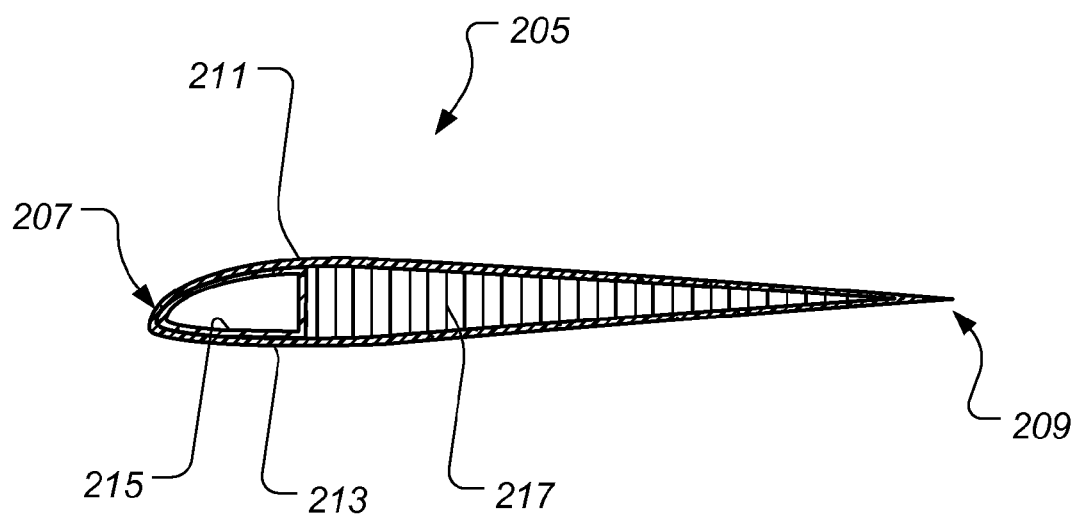
FIG. 3 is a cross-sectional view of the rotor blade, taken from section lines 3-3 in FIG. 2.

Referring now also to FIGS. 2 and 3, rotor blade 205 is an example of a rotorcraft member than can be configured with core to efficiently provide strength and stiffness. Rotor blade 205 can include a leading edge portion 207, a trailing edge portion 209, a root end portion 203, and a tip end portion 205. In the illustrated embodiment, an upper skin 211 and a lower skin 213 form an aerodynamic surface with a spar member 215 and a core member 217 forming the internal structure.

It should be appreciated that rotorcraft 101 is merely illustrative of an aircraft for with which one or more methods of the present disclosure can be utilized with regard to. Further, rotor blade 205 is merely illustrative of the wide variety of core stiffened structures that can utilize one or methods disclosed herein. In another embodiment, a horizontal stabilizer 115 is the core stiffened structure, for example.

Figure 4:
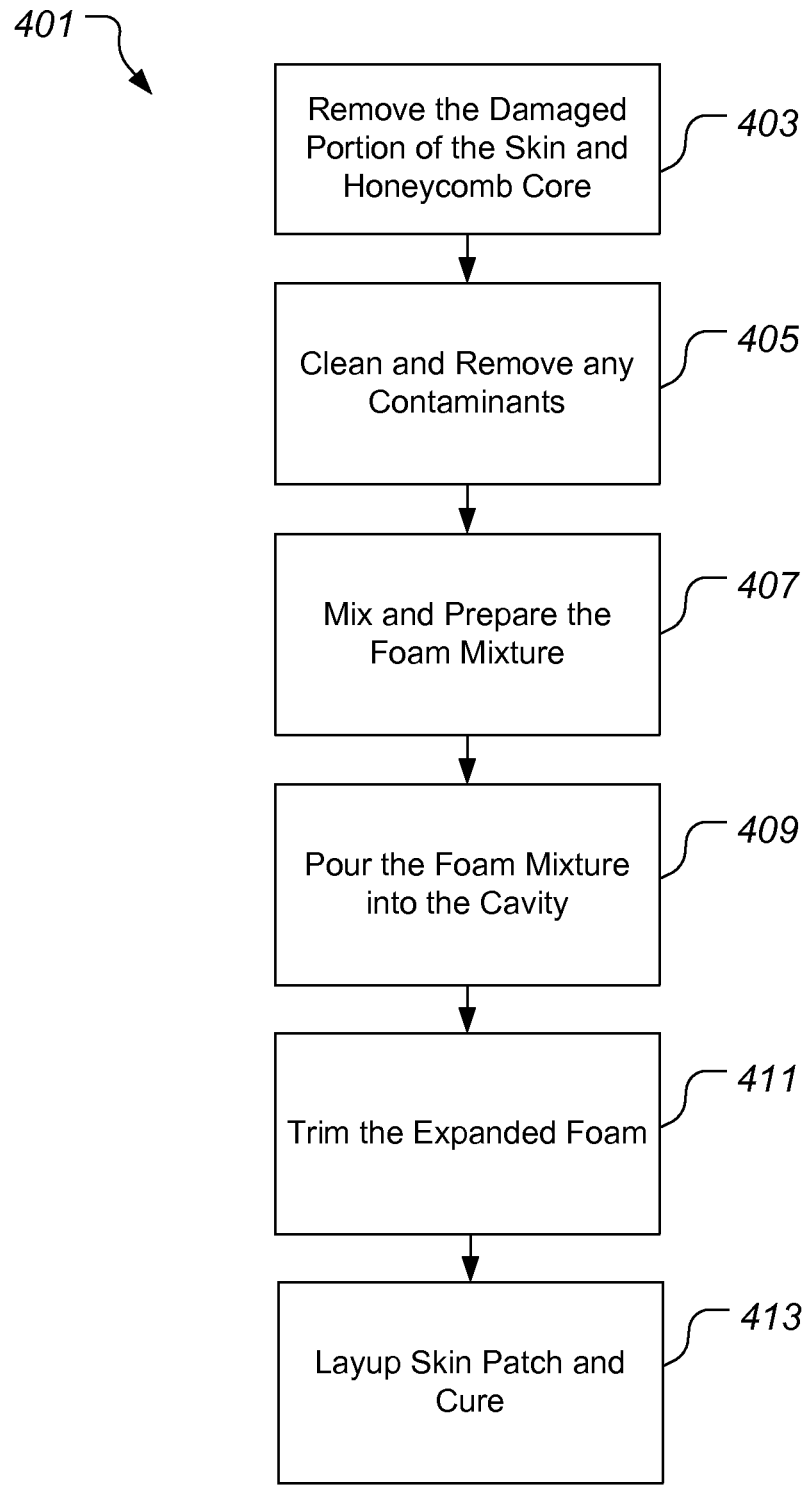
FIG. 4 is a schematic view of a method of repairing a honeycomb core stiffened structure, according to an illustrative embodiment.

Referring now to FIG. 4, a method 401 of repairing a honeycomb core stiffened structure is schematically illustrated. During operation of rotorcraft 101, damage to a core stiffened structure can occur in a variety of scenarios, such as a collision with an object. In order to ensure safety of the rotorcraft, the damaged portion of the core stiffened structure must be repaired. It should be appreciated that the damage can exist in the skin and/or the honeycomb core. However, removal of the damaged skin may also require repair of the honeycomb core since the skin and the honeycomb core are bonded together. For illustrative purposes, method 401 is illustrated and described herein with regard to repair of rotor blade 205; however, it should be appreciated that method 401 can be performed on any core stiffened structure.

Figure 5:
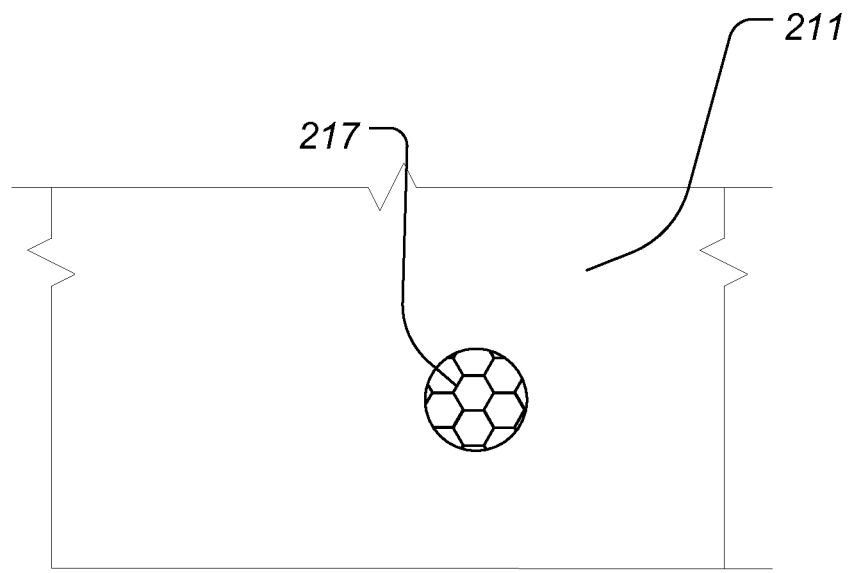
FIG. 5 is a top view of a portion of a rotor blade, for illustrative purposes.
Figure 6:
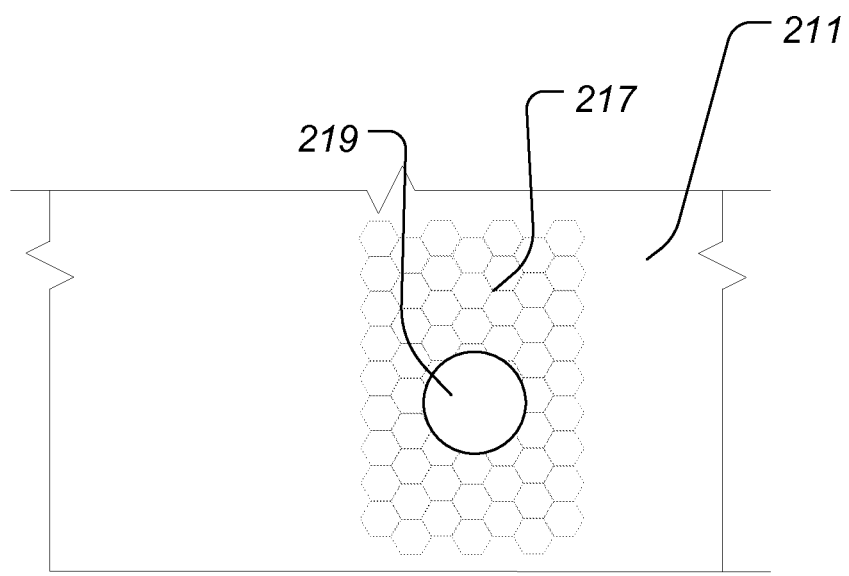
FIG. 6 is a top view of a portion of a rotor blade, for illustrative purposes.

Method 401 can include a step 403 of removing the damaged portion of skin, such as upper skin 211, and the damaged portion of honeycomb core, such as core member 217. For illustrative purposes, FIG. 5 shows the damaged skin portion removed by a cutout, which in the illustrated embodiment is circular. Further, FIG. 6 shows the damaged core portion removed, which creates a cavity 219. Removal of the damaged skin portion and the damaged core portion can be performed with a circular saw, for example.

Method 401 can further include a step 405 for cleaning and removing any contaminants in and around cavity 219. Step 405 can include using a cleaning solution, such as an alcohol based fluid to remove contaminants.

Figure 8:
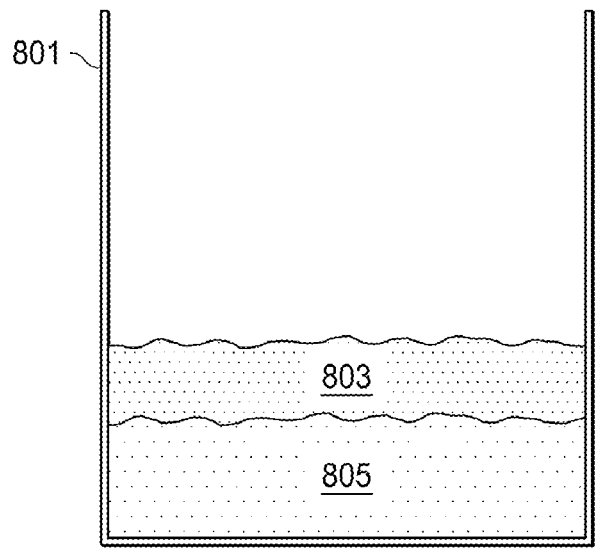
FIG. 8 is a stylized view of components of the foam system, according to an illustrative embodiment of present application.
Figure 9:
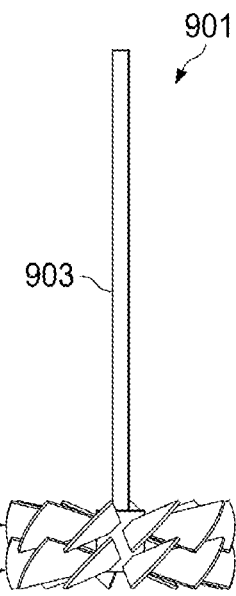
FIG. 9 is a front view of a mixer used to mix the foam system, according to an illustrative embodiment of present application.
Figure 10:
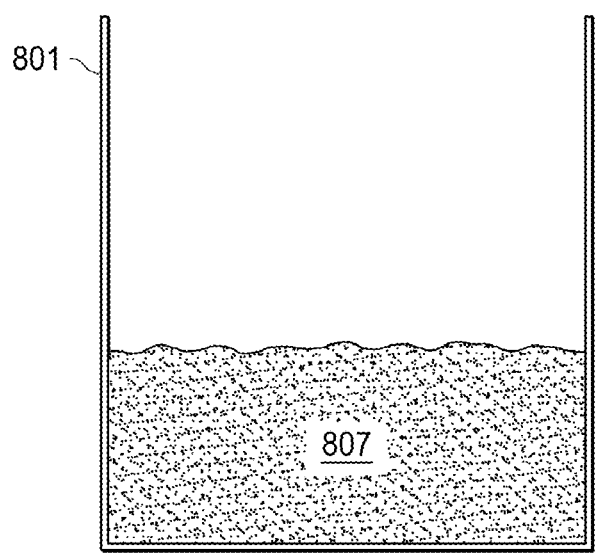
FIG. 10 is a stylized view of a mixture of the foam system, according to an illustrative embodiment of present application.

Method 401 can include a step 407 for mixing and preparing a foam mixture. Referring now also to FIGS. 8-10, the foam system used in method 401 is preferably a pourable urethane foam system that expands to fill cavity 219 of core member 217. Upon curing, the foam is preferably rigid and flexible, while having a relatively low density, or a density similar to the core. In the illustrated embodiment, the foam system is a polyisocyanurate pour foam system marketed under the name of Stepanfoam BX 450, by the Stepan Chemical Company. It should be fully appreciated that other foam systems may be used. The Stepanfoam BX 450 includes two separate resin components, namely a resin T (70% by weight) 805 and a resin R (30% by weight) 803. The desired weight amounts of resin T 805 and resin R 803 are measured and poured into a container 801. The resin T 805 and resin R 803 are mechanically agitated to form a homogenous mixture 807. A mixer 901 can be used in rotation in order to mix resin T 805 and resin R 803 to form mixture 807. Mixer 901 includes a shaft 903, the shaft 903 being configured to be driven by a drill motor, or the like. Mixer 901 may include a plurality of blades located on a first blade disc 905 and a second blade disc 907. In the illustrated embodiment, mixer 901 is rotated at 3500 revolutions per minute for 10-15 seconds when mixing resin T 805 and resin R 803 to form mixture 807.

Figure 7:
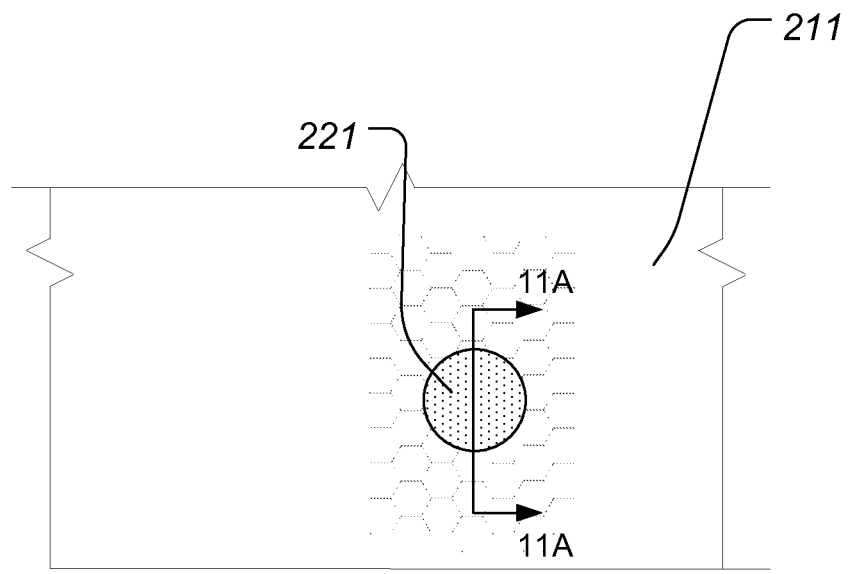
FIG. 7 is a top view of a portion of a rotor blade, for illustrative purposes.

A step 409 includes pouring foam mixture 807 into cavity 219. Once the mixing in step 409 is complete, it is preferred that mixture 807 is poured into cavity 219 as quickly as possible. Once foam mixture 807 is poured into cavity 219, foam mixture 807 is allowed to expand and fill the space of cavity 219 so as to form an expanded foam 221 (shown in FIG. 7). In the illustrated embodiment, the foam mixture 807 is allowed to "free rise"; however, an alternative embodiment can include restricting the expansion by placing an upper mold over the cavity 219. Preferably, the upper mold would include an opening that allows the release of outgases.

Figure 11A:
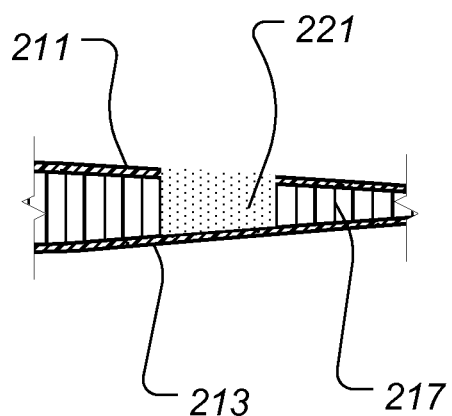
FIG. 11A is a cross-sectional view of the rotor blade, taken from section lines 11A-11A in FIG. 7.

A step 411 includes trimming the expanded foam 221 after foam mixture 807 has fully expanded and become semi-rigid. Trimming the expanded foam 221 includes reducing the outer surface to correspond approximately with the outer airfoil surface of upper skin 211. Step 411 can be performed by any variety of processes, such as a cutting, sanding, machining, to name a few examples. FIG. 11A is an illustration of expanded foam 221 trimmed such that the outer surface corresponds approximately to the outer airfoil surface of upper skin 211.

Figure 11B:
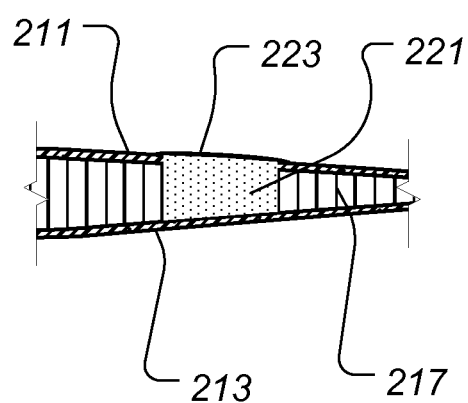
FIG. 11B is a cross-sectional view of the rotor blade, similar to FIG. 11A.

A step 413 includes laying up a composite skin patch 223 on the expanded foam 221 and allowing the repair assembly to cure. An illustrative composite skin patch 223 is shown in FIG. 11B. In the illustrated embodiment, composite skin patch 223 is a plurality of strips of composite fibers with resin (i.e. pre-preg). Composite skin patch 223 can be laid directly onto the outer surface of expanded foam 221. Composite skin patch 223 and expanded foam 221 are allowed to cure. In the illustrated embodiment, the curing of composite skin patch 223 and expanded foam 221 takes place at room temperature, such that an artificial heat source is not required. In another embodiment, skin patch 223 can be a precured composite skin patch or of another rigid material, such as a metal skin patch. In such an embodiment, the rigid skin patch can be adhesively bonded to the expanded foam 221 with an adhesive.

Method 401, as described further herein, includes significant advantages of conventional repair methods. For example, method 401 does not require special repair tooling that would otherwise be required to separately lay-up and cure a composite patch. Further, method 401 does not require thermal equipment that would be required if an adhesive as used that required an elevated temperature to cure. Further, method 401 can be performed in the field such that repairs to composite core stiffened structures do not have to be performed in a facility having specialized equipment. Further, when method 401 is performed on composite core stiffened structure wherein the composite core is large cell core (cells greater than 0.5 inches), the expanded foam 221 (as trimmed) acts as a tooled surface so as to provide uniform support of the composite skin patch 223 prior and during curing.

It should be appreciated that method 401 can be performed on a wide variety of core-stiffened structures. Further, the core-stiffened structures can have a core member 217 comprising any variety of materials, such as carbon, paper, Nomex®, fiberglass, Kevlar®, plastic, metal, foam, to name a few examples. Further, core member 217 can have cell members of a variety of shapes, such as square, hexagonal, elliptical, round, to name a few examples. Further, core member 217 may not even have cell members, particularly when core member 217 is a foam material.

Figure 12:
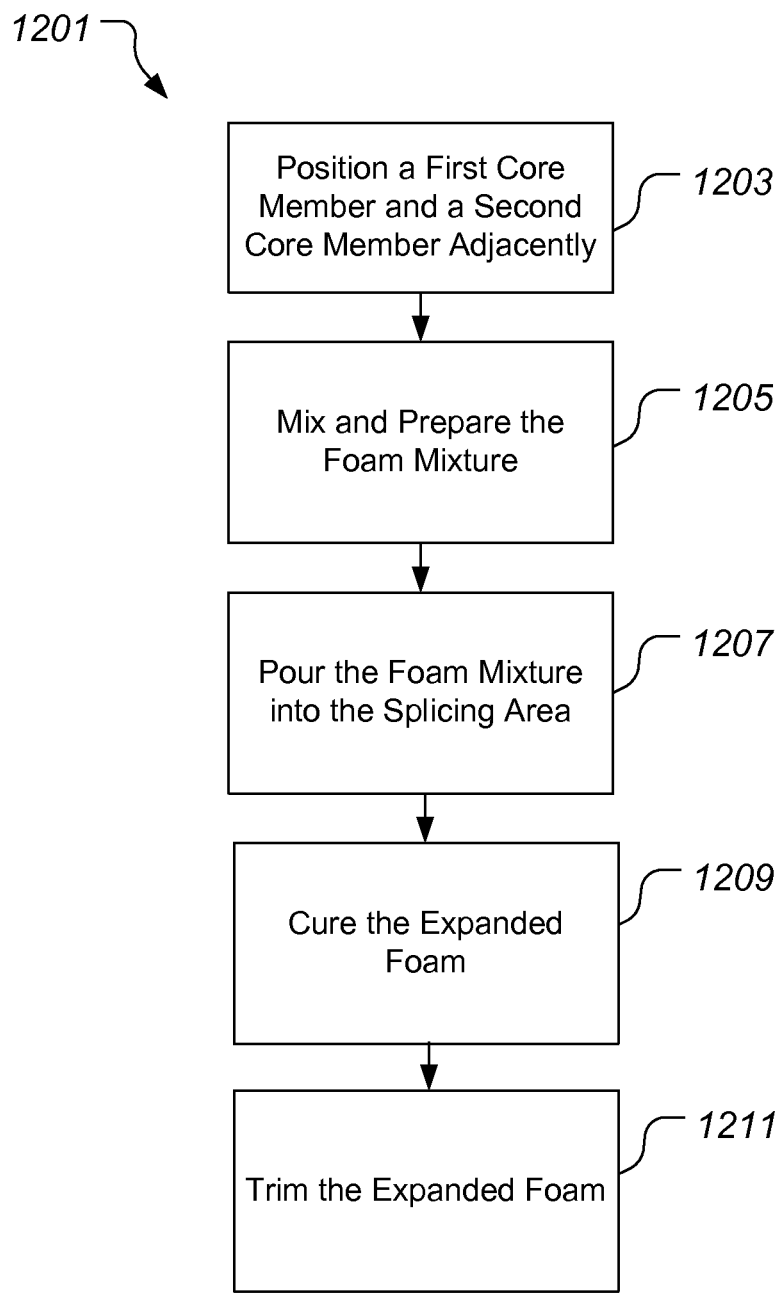
FIG. 12 is a schematic view of a method of splicing together one or more sections of core material, according to an illustrative embodiment.

Referring now to FIG. 12, a method 1201 of splicing together one or more sections of core material is schematically illustrated. During fabrication of a core stiffened structure, such as rotor blade 205, it can be necessary to splice one or more sections of core material together. However, conventional methods of splicing core material have significant deficiencies, as described further herein.

Figure 13:
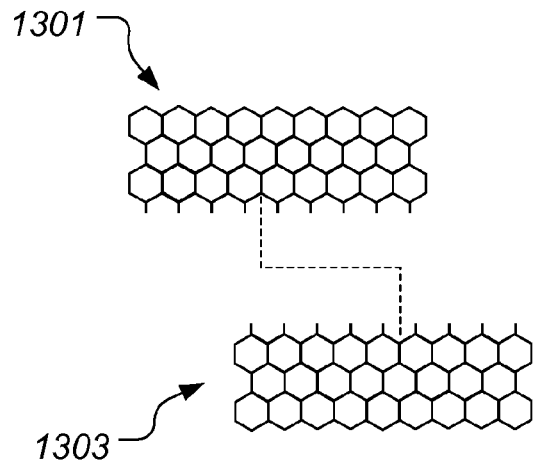
FIG. 13 is a top stylized view of a method of splicing together one or more sections of core material, according to an illustrative embodiment.

Referring also to FIG. 13, method 1201 can include a step 1203 of positioning a first core member 1301 adjacent to a second core member 1303. Step 1203 can be implemented in a variety of environments. For example, tooling can be used for aligning first core member 1301 adjacent to second core member 1303; however, tooling is not necessarily required. One advantage of using foam for splicing first core member 1301 to second core member 1303 is the increase in bonding surface reduces the importance of bond surface alignment that can exist in a conventional adhesive bonding procedure.

Step 1205 includes preparing and mixing the foam mixture, which is similar to step 407 described herein with regard to method 401. Method 1201 also includes a step 1207 for pouring the foam mixture into the splicing area common to the cell walls of first core member 1301 and second core member 1303. In another embodiment, step 1207 is accomplished by pouring the foam mixture into a cavity below splicing area so that the foam mixture expands and rises into the splicing area, similar to as described with regard to FIG. 33. Such a technique may be particularly desirable when the cells are relatively small and/or the cell walls lack porosity. The foam mixture is allowed to expand into an expanded foam. A step 1209 includes curing the expanded foam. In the illustrated embodiment, the expanded foam can be cured at room temperature in a relatively short about of time. One advantage of method 1201 is that the process does not require thermal equipment that may otherwise be required to cure a conventional adhesive. A step 1211 can include trimming the expanded foam to be flush with the upper and lower surfaces of first core member 1301 and second core member 1303. Step 1211 can also include machining the first core member 1301 and the second core member 1303 to a desired contour while also trimming the expanded foam.

Figure 14:
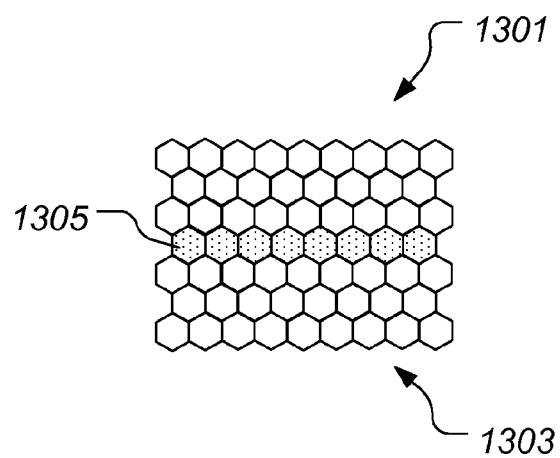
FIG. 14 is a top stylized view of a method of splicing together one or more sections of core material, according to an illustrative embodiment.
Figure 15:
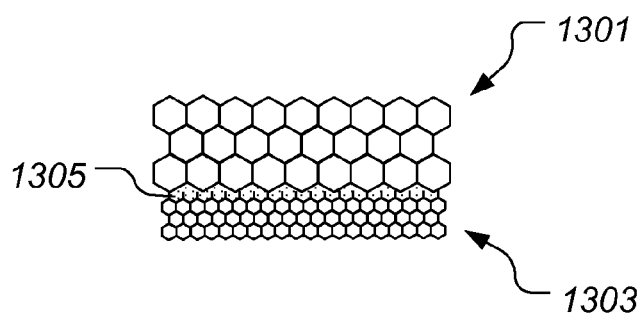
FIG. 15 is a top stylized view of a method of splicing together one or more sections of core material, according to an illustrative embodiment.
Figure 16:
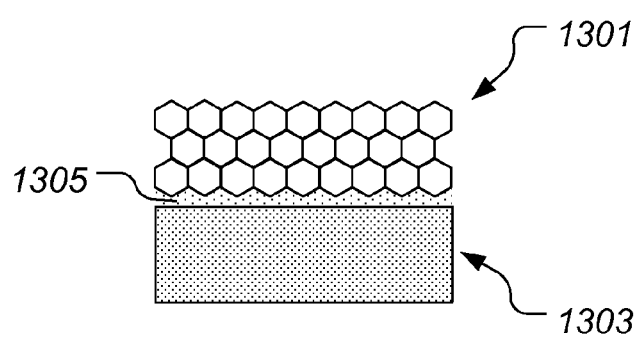
FIG. 16 is a top stylized view of a method of splicing together one or more sections of core material, according to an illustrative embodiment.

Referring now also to FIGS. 14-16, example embodiments of core members spliced together using method 1201 are illustrated. Referring in particular to FIG. 14, first core member 1301 and second core member 1303 are both honeycomb composite core members of the same size and material. Expanded foam 1305 is bonding contact with the adjacent cell walls of first core member 1301 and second core member 1303. Referring in particular to FIG. 15, first core member 1301 and second core member 1303 are in bonding contact with expanded foam 1305. In the illustrated embodiment, second core member 1303 has smaller sized cell members compared to first core member 1301. The illustrated embodiment is meant to demonstrate how the expanded foam 1205 is particularly advantageous for splicing together core members having different geometry and/or cell sizes. As illustrated, expanded foam 1205 provides bonding contact with the cell walls of first core member 1301 and second core member 1303 even though the geometry of the cell walls don't provide symmetric bonding surfaces. Further, the splicing of two different core members, each having different geometries, can be particularly useful when tailoring stiffness across a structure. For example, rotor blade 205 can have spliced core members such that the larger core member is located more towards spar member 215 while the smaller core member is located towards the trailing edge 209. It should be appreciated that method 1201 can be employed to splice any number of core members together, the core members having any variety of cell sizes and geometries.

Referring in particular to FIG. 16, first core member 1301 and second core member 1303 are in bonding contact with expanded foam 1305. In the illustrated embodiment, second core member 1303 is a foam core that does not have honeycomb shaped cell members. Second core member 1303 can be any type of foam of supporting structure having a homogenous material continuity. For example, second core member can be of a polyvinyl chloride (PVC) type material. Method 1201 is particularly well suited for splicing a traditional honeycomb core member to a solid core since the expanded foam 1305 adheres well to both members, unlike traditional splicing adhesives.

Figure 17:
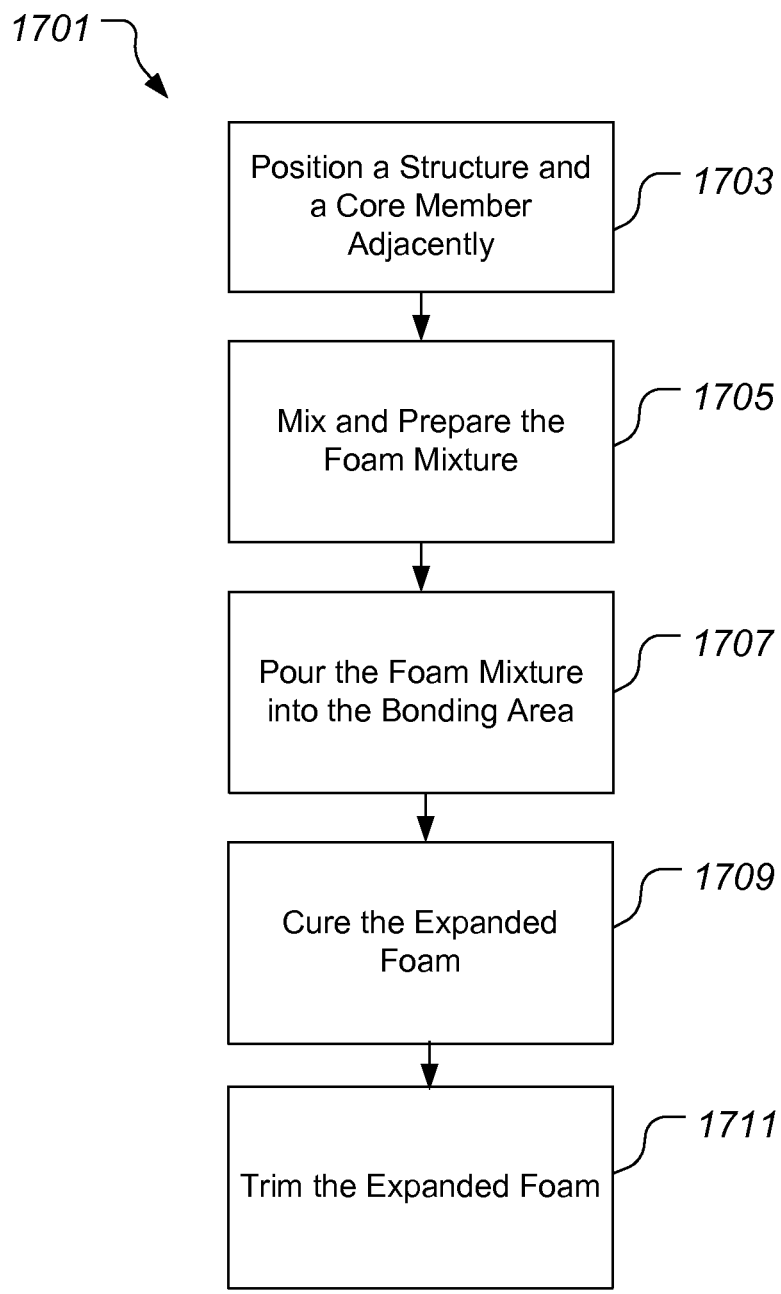
FIG. 17 is a schematic view of a method of joining together core material to a structure, according to an illustrative embodiment.

Referring now to FIG. 17, a method 1701 of joining together a core material to a structure is schematically illustrated. During fabrication of a core stiffened structure, such as rotor blade 205, it can be desirable to abutly join a core member, such as core 217, to a structure, such as spar 215 (shown in FIG. 3). However, conventional methods of joining core material to structure have significant deficiencies, as described further herein.

Figure 18:
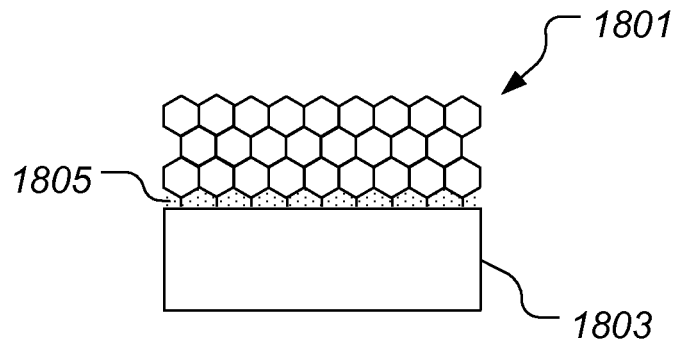
FIG. 18 is a top stylized view of a method of joining together core material to a structure, according to an illustrative embodiment.

Referring also to FIG. 18, method 1701 can include a step 1703 of positioning a core member 1801 adjacent to a structure 1803. Step 1703 can be implemented in a variety of environments. For example, tooling can be used for aligning core member 1801 adjacent to structure 1803; however, tooling is not necessarily required. One advantage of using foam for joining core member 1801 to structure 1803 is the increase in bonding surface prevents the meticulous adhesive application along mating portions of core member 1801 to structure 1803, which may otherwise be required in a conventional process.

Step 1705 includes preparing and mixing the foam mixture, which is similar to step 407 described herein with regard to method 401. Method 1701 also includes a step 1707 for pouring the foam mixture into the joining area common to the exposed cell walls of core member 1801 and the exposed surface of structure 1803. In another embodiment, step 1707 is accomplished by pouring the foam mixture into a cavity below joining area so that the foam mixture expands and rises into the joining area, similar to as further described with regard to FIG. 33. Such a technique may be particularly desirable when the joining area is relatively small and the cell walls lack porosity. The foam mixture is allowed to expand into an expanded foam 1805. A step 1709 includes curing expanded foam 1805. In the illustrated embodiment, the expanded foam 1805 can be cured at room temperature in a relatively short amount time. One advantage of method 1701 is that the process does not require thermal equipment that may otherwise be required to cure a conventional adhesive. A step 1711 can include trimming the expanded foam 1805 to be flush with the upper and lower surfaces of core member 1801 and structure 1803.

Figure 19:
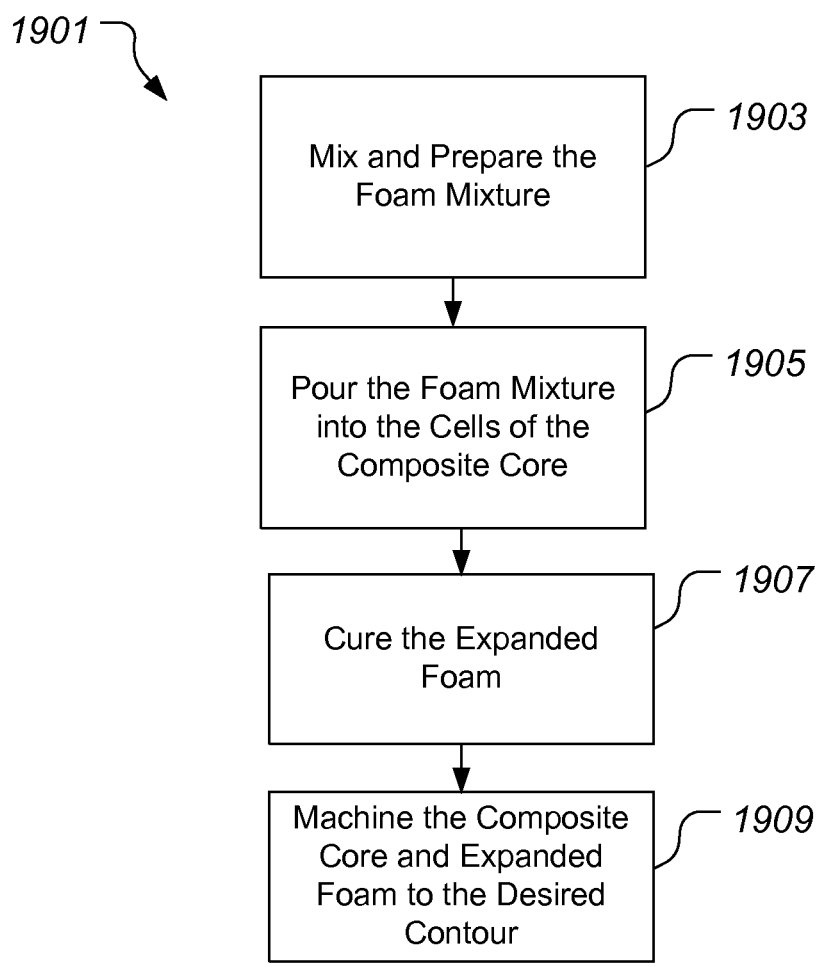
FIG. 19 is a schematic view of a method of machining honeycomb core, according to an illustrative embodiment.

Referring now to FIG. 19, a method 1901 of machining honeycomb core is schematically illustrated. During fabrication of a core stiffened structure, such as rotor blade 205, it is necessary to machine the honeycomb core member, such as core 217 (shown in FIG. 3), to a desired contour. However, conventional methods of machining core material have significant deficiencies, as described further herein.

Figure 20:
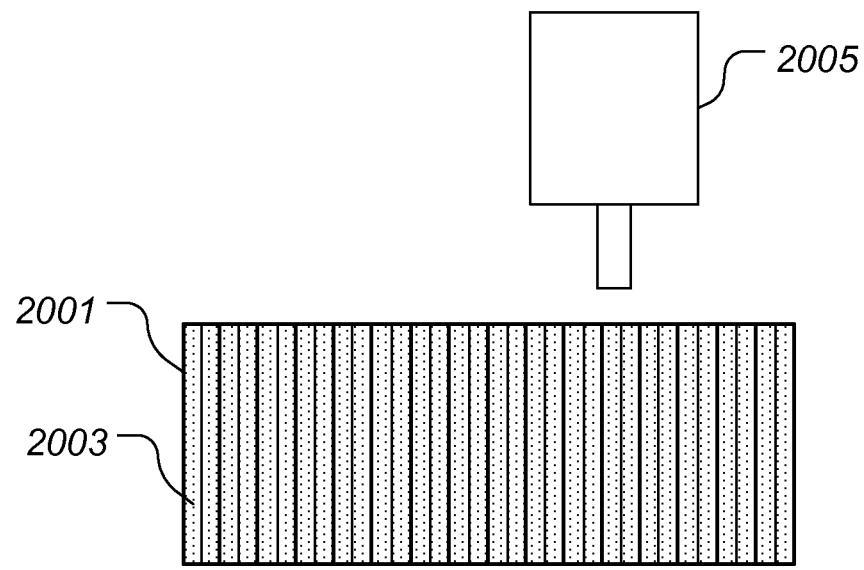
FIG. 20 is a cross-sectional stylized view of a method of machining honeycomb core, according to an illustrative embodiment.
Figure 21:
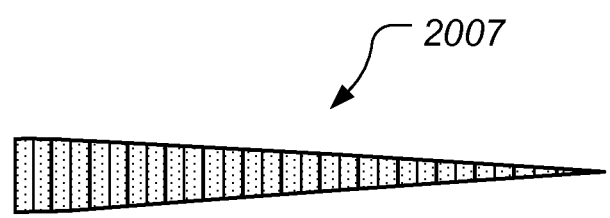
FIG. 21 is a cross-sectional stylized view of a machined honeycomb core, according to an illustrative embodiment.

Referring also to FIGS. 20 and 21, method 1901 can include a step 1903 of preparing and mixing the foam mixture, which is similar to step 407 described herein with regard to method 401. Method 1901 also includes a step 1905 of pouring the foam mixture into the cells of a stock core member 2001. In another embodiment, step 1907 is accomplished by pouring the foam mixture into a cavity below the cells so that the foam mixture expands and rises into the cells, similar to as further described with regard to FIG. 33. Such a technique may be particularly desirable when the cell are relatively small and/or the cell walls lack porosity. The foam mixture is allowed to expand into an expanded foam 2003. A step 1907 includes curing expanded foam 2003. In the illustrated embodiment, the expanded foam 2003 can be cured at room temperature.

Method 1901 includes a step 1909 of machining the stock core member 2001 containing expanded foam 2003 to a desired contour. A contouring machine 2005 can be used to controllable machine away undesired portions of stock core member 2001 containing expanding foam 2003 until the desired contour is achieved. Referring to FIG. 21, a final foam filled core member 2007 is illustrated. Using expanded foam 2003 to support the honeycomb core during machining not only increases the speed at which the honeycomb core can be machined, but also allows the honeycomb core to be machined at more severe angles, smaller thicknesses, and complex contours. Further, expanded foam 2003 adds strength and stiffness to stock core member 2001.

Figure 22:
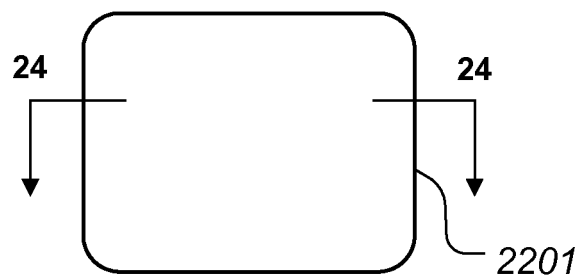
FIG. 22 is a top view of a core stiffened structure, according to an illustrative embodiment.
Figure 23:
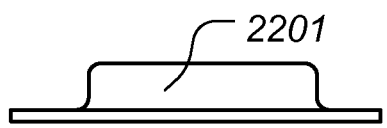
FIG. 23 is a front view of a core stiffened structure, according to an illustrative embodiment.
Figure 24:
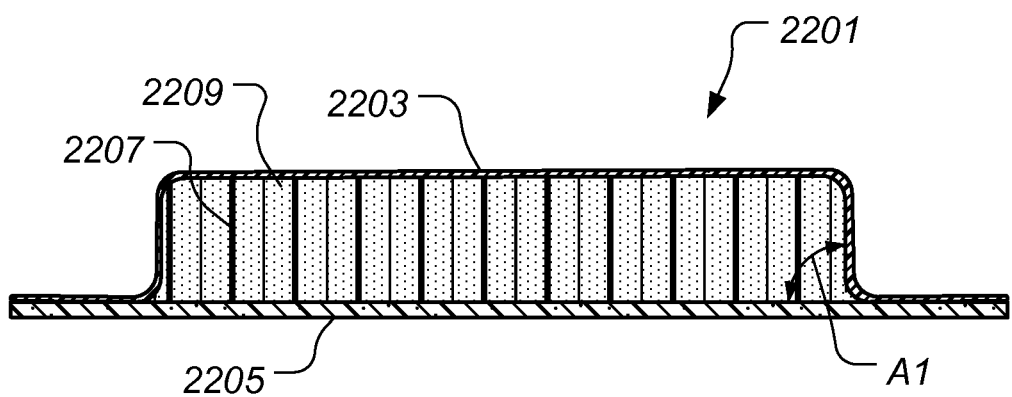
FIG. 24 is a cross-sectional view of a core stiffened structure, taken at section lines 24-24 in FIG. 22, according to an illustrative embodiment.

Referring now to FIGS. 22-24, a core stiffened structure 2201 that is manufactured utilizing one or more methods described herein is illustrated. Structure 2201 can be any of a variety of structural members. For example, structure 2201 can be a panel 113 on rotorcraft 101, as illustrated in FIG. 1. Structure 2201 can have an upper skin 2203, a lower skin 2205, and a honeycomb core 2207 filled with an expanded foam 2209. Honeycomb core 2207 can be filled with expanded foam 2209 and machined with method 1901, as described further herein.

Structure 2201 is illustrative of one unique advantage of utilizing honeycomb core 2207 filled with expanded foam 2209. Not only can the honeycomb core be machined faster and more accurately when filled with expanded foam, but structure 2201 can be manufactured so that the structure itself is more efficient. Unlike traditional composite core structures, the end portions of honeycomb 2207 can be vertical since the expanded foam 2209 provides the necessary strength to withstand autoclave pressure during the curing of structure 2201. In the illustrated embodiment, the end portion or ramp angle A1 is 90°; however, alternative embodiments can have a ramp angle A1 that is less than 90°. For example, ramp angle A1 can be 75°. Conventional composite core structures are restricted to a ramp angle less than 27° so that the honeycomb core does not crush during the autoclave pressure of the curing cycle.

Figure 25:
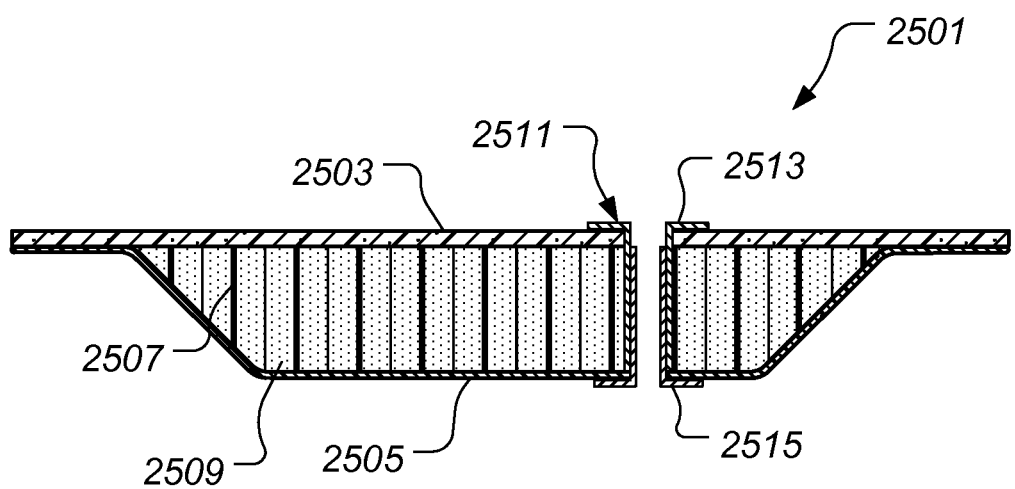
FIG. 25 is a cross-sectional view of a core stiffened structure, according to an illustrative embodiment.
Figure 26:
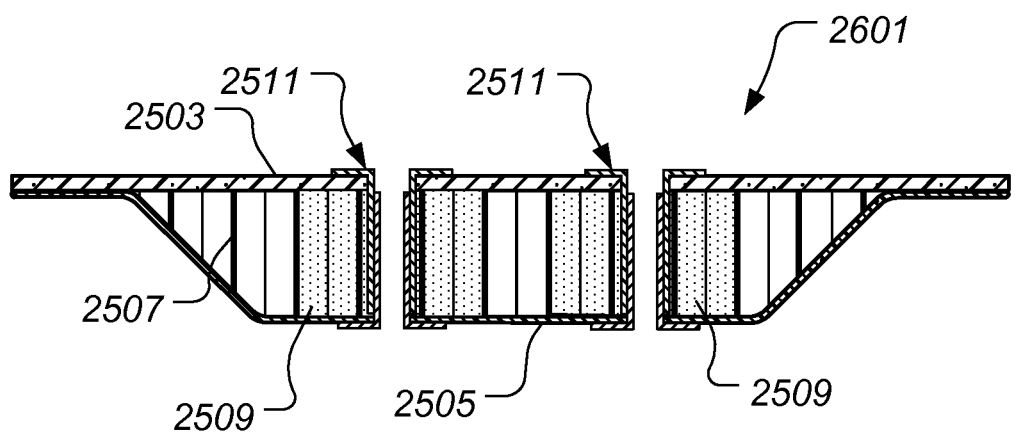
FIG. 26 is a cross-sectional view of a core stiffened structure, according to an illustrative embodiment.

Referring now to FIGS. 25 and 26, a core stiffened structure 2501 that is manufactured utilizing one or more methods described herein is illustrated. Structure 2501 can have any of a variety of structural implementations. For example, structure 2501 can be a floor panel within fuselage 107 on rotorcraft 101, as illustrated in FIG. 1. Structure 2501 can have an upper skin 2503, a lower skin 2505, and a honeycomb core 2507 filled with an expanded foam 2509. Honeycomb core 2507 can be filled with expanded foam 2509 and machined with method 1901, as described further herein.

Structure 2501 is illustrative of one unique advantage of utilizing honeycomb core 2507 filled with expanded foam 2509. Not only can the honeycomb core 2507 be machined faster and more accurately when filled with expanded foam 2509, but structure 2501 can be utilized to support out-of-plane loads with an attachment assembly, such as sleeve assembly 2511, without having to use a heavy potting compound since the expanded foam 2509 provides the necessary strength to support the loading around the sleeve assembly 2511. In the illustrated embodiment, the attachment assembly is illustrated as sleeve assembly 2511; however, it should be appreciated that the attachment assembly can be any of a variety of attachment members configured for coupling to an apparatus. For example, sleeve assembly 2511 is particularly well suited as a mounting apparatus for an occupant seat on the floor member 2501 of rotorcraft 101. Sleeve assembly 2511 can have an upper sleeve 2513 and a lower sleeve 2515 that matingly fit together. In one embodiment, sleeve assembly 2511 has internal threads that are configured for receiving a seat attachment fitting.

Referring in particular to FIG. 26, structure 2601 is substantially similar to structure 2501 except that expanded foam 2509 does not completely fill honeycomb core 2507, but rather expanded foam 2509 is particularly located in regions where each sleeve assembly 2511 is to be installed. A large floor panel structure can have any plurality of regions of expanded foam 2509 so that a desired seating configuration can be mounted to the structure with the implementation specific attachment assembly.

Figure 27:
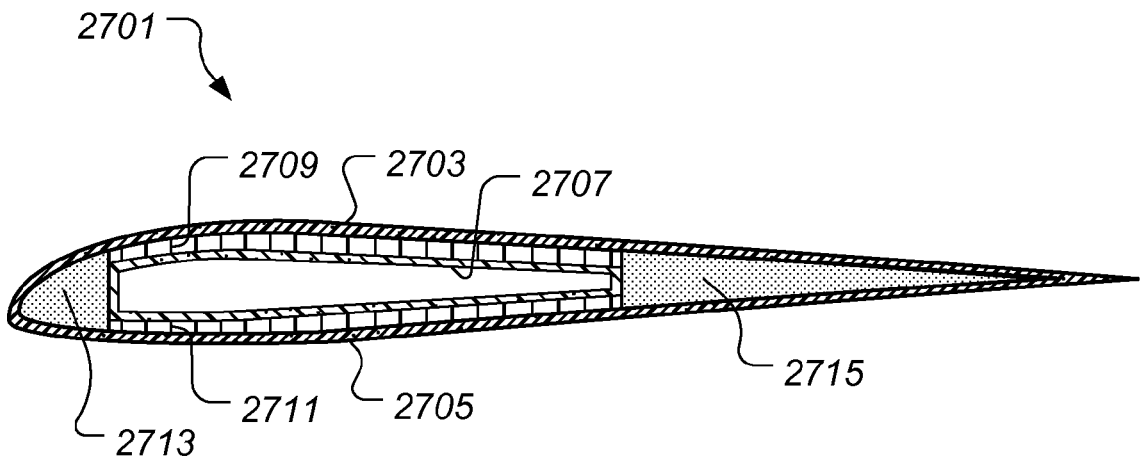
FIG. 27 is a cross-sectional view of a core stiffened structure, according to an illustrative embodiment.

Referring now to FIG. 27, a core stiffened structure 2701 that is manufactured utilizing one or more methods described herein is illustrated. Structure 2701 can have any of a variety of structural implementations. For example, structure 2701 can be a horizontal stabilizer 115 on rotorcraft 101, as illustrated in FIG. 1. Structure 2701 can have an upper skin 2703, a lower skin 2705, an inner support 2707, an upper core member 2709, a lower core member 2711, a forward foam member 2713, and an aft foam member 2715. In the illustrated embodiment, upper core member 2709 and lower core member 2711 are not filled with foam, but in an alternative embodiment upper core member 2709 and a lower core member 2711 are filled with expanded foam, such as expanded foam 2509, illustrated in FIG. 25 and further described herein. In another embodiment, only upper core member 2709 is filled with foam in order to provide increased strength and stiffness to withstand heat induced stressed near the upper surface, the heat being discussed further below.

Core stiffened structure 2701 utilizes forward foam member 2713 for structurally joining forward edges of upper core member 2709 and lower core member 2711 together with upper skin 2703, lower skin 2705, and inner support 2707. Similarly, aft foam member 2715 structurally joins aft edges of upper core member 2709 and lower core member 2711 together with upper skin 2703, lower skin 2705, and inner support 2707. The filling and adhesion qualities make expandable foam uniquely capable of joining honeycomb core members that are out-of-plane to each other. In other words, expandable foam can be used to join honeycomb core members that are not adjacent to each other in the same plane.

In the illustrated embodiment, core stiffened structure 2701 can be manufactured by assembling the components, then subsequently filling the respective cavities to form forward foam member 2713 and aft foam member 2715 with foam. Forward foam member 2713 and aft foam member 2715 can be formed by mixing pourable foam as described in step 407 of method 401, and then pouring the foam into the cavities as similarly described in step 409 of method 401. The expanded foam can be trimmed and cured, as also further described herein.

In the illustrated embodiment, core stiffened structure 2701 is a horizontal stabilizer which can be subjected to heat from the exhaust system. The dynamic heat flow typically subjects the upper surface of the structure 2701 to the most severe heat. In order to withstand, upper skin 2703 is formed from a composite system having a high temperature resistance resin, such as Bismaleimide (BMI) resin. However, BMI resin is typically expensive and expensive to use. As such, the unique configuration of core stiffened structure 2701 inhibits heat transfer from upper skin 207 to lower skin 2705 because the honeycomb core does not extend from the upper surface to the lower surface, rather inner support 2707 separates the honeycomb core between upper core member 2709 and lower core member 2711, thereby acting as an insulator. Further, forward foam member 2713 and aft foam member 2715 structural join upper core member 2709 and lower core member 2711 while also inhibiting heat transfer therebetween. Such a configuration allows lower skin 2705 to be manufactured out of a composite system having a typical non-high temperature resin, thereby saving the expense associated with using BMI resin.

It should be appreciated that even though internal member 2707 is illustrated as an enclosed member, the geometry of internal member 2707 is implementation specific. For example, an alternative embodiment of internal member 2707 can be C-shaped, I-shaped, or even be multiple single surface members, to name a few examples.

Figure 28:
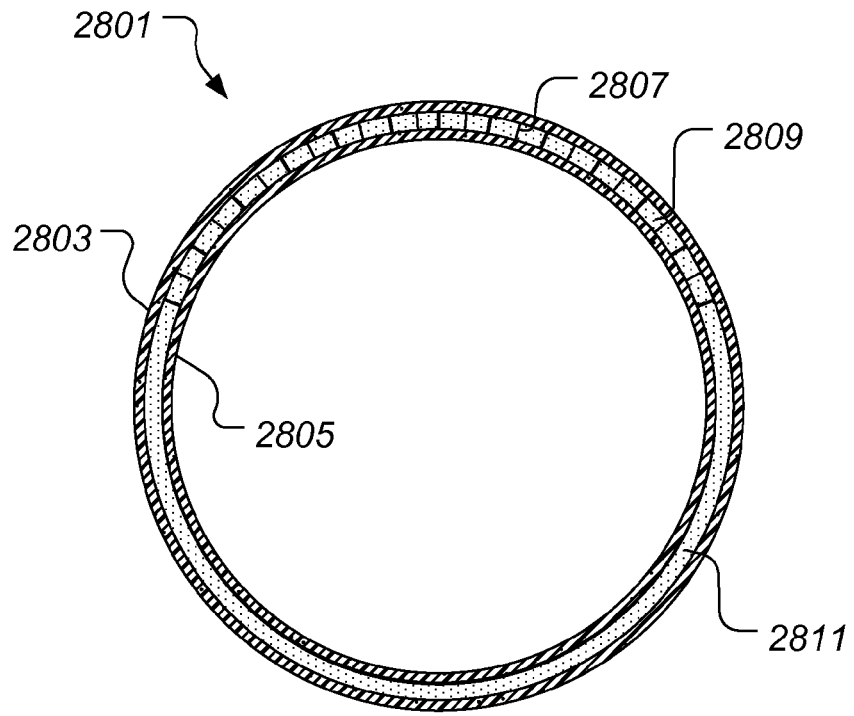
FIG. 28 is a cross-sectional view of a core stiffened structure, according to an illustrative embodiment.

Referring now to FIG. 28, a core stiffened structure 2801 that is manufactured utilizing one or more methods described herein is illustrated. Structure 2801 can have any of a variety of structural implementations. For example, structure 2801 can be a tailboom member on a rotorcraft. Structure 2801 can have an outer skin 2803, an inner skin 2805, a core member 2807, and a foam member 2811. In the illustrated embodiment, core member 2807 is filled with expanded foam 2809; however, in an alternative embodiment core member 2807 is void of expanded foam 2809. Expanded foam 2809 inhibits heat transfer from outer skin 2803 to inner skin 2805, as discussed further below.

Core stiffened structure 2801 utilizes foam member 2811 for structurally joining edges of core member 2807. The filling and adhesion qualities make expandable foam uniquely capable of joining honeycomb core members that are out-of-plane to each other. In other words, expandable foam can be used to join honeycomb core members that are not adjacent to each other in the same plane.

In the illustrated embodiment, core stiffened structure 2801 can be manufactured by assembling the components, then subsequently filling the respective cavity with foam to form foam member 2811. Foam member 2811 can be formed by mixing pourable foam as described in step 407 of method 401, and then pouring the foam into the cavity as similarly described in step 409 of method 401. The expanded foam can be trimmed and cured, as also further described herein. Core member 2807 can be formed by method 1901, for example.

In the illustrated embodiment, core stiffened structure 2801 is a tailboom member which can be subjected to heat from the exhaust system of the rotorcraft. The heat flow typically subjects the upper surface of the structure 2801 to the most severe heat. In order to withstand, an upper portion of outer skin 2803 is formed from a composite system having a high temperature resistance resin, such as Bismaleimide (BMI) resin. However, BMI resin is typically expensive and expensive to use. As such, the unique configuration of core stiffened structure 2801 inhibits heat transfer from outer skin 2803 to inner skin 2805 because the expanded foam 2809 inhibits heat flow through honeycomb core 2807, thereby acting as an insulator. Such a configuration also allows the remaining portion of outer skin 2803 and the inner skin 2805 to be manufactured out of a composite system having a typical non-high temperature resin, thereby saving the expense associated with using BMI resin.

Figure 29:
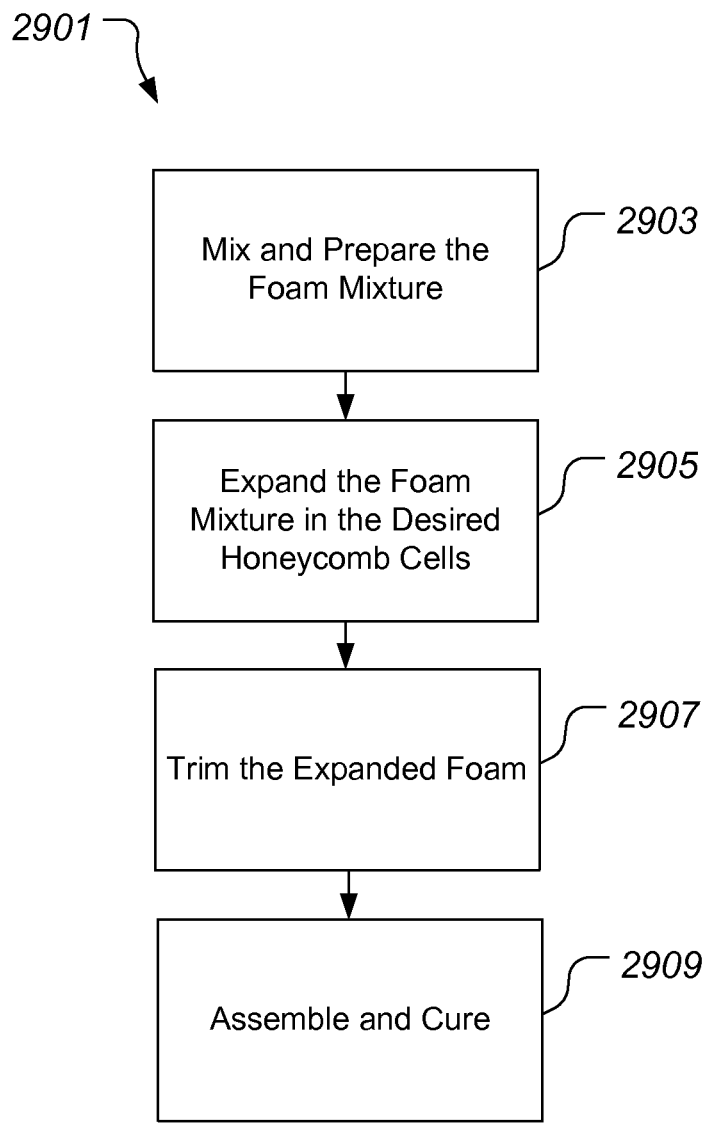
FIG. 29 is a schematic view of a method of stabilizing honeycomb core for an autoclave cure cycle of a core stiffened structure, according to an illustrative embodiment.
Figure 30:
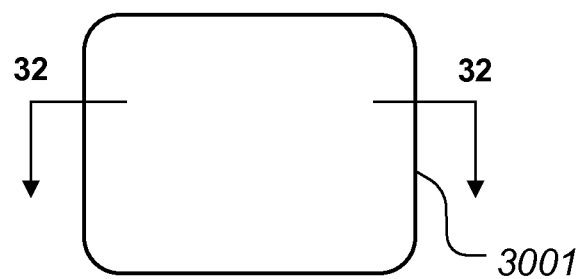
FIG. 30 is a top view of a core stiffened structure, according to an illustrative embodiment.
Figure 31:
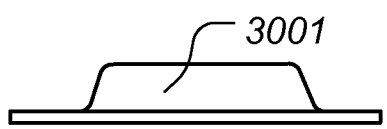
FIG. 31 is a front view of a core stiffened structure, according to an illustrative embodiment.
Figure 32:
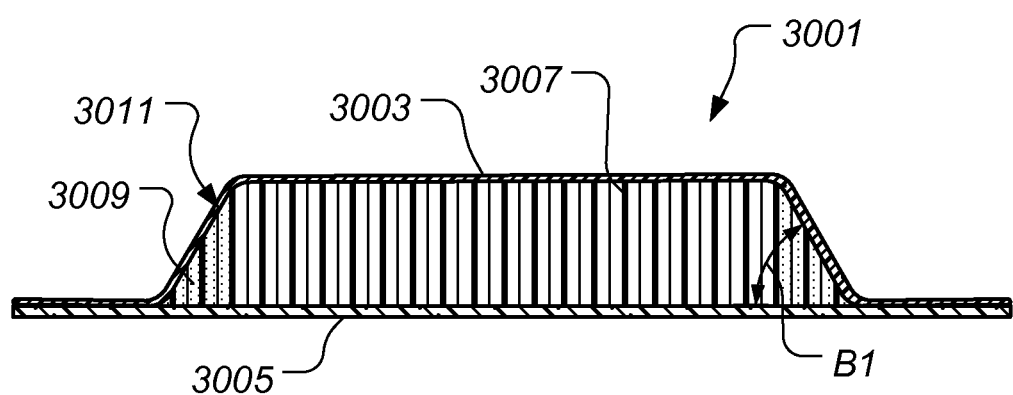
FIG. 32 is a cross-sectional view of a core stiffened structure, taken at section lines 32-32 in FIG. 30, according to an illustrative embodiment.

Referring now to FIG. 29, a method 2901 of stabilizing honeycomb core during an autoclave cure of a core stiffened panel is schematically illustrated. Conventionally, honeycomb core is required to have low angle beveled edge portions to prevent a crushing of the honeycomb core due autoclave pressure in the curing cycle. Conventionally, if the geometry of the core stiffened panel did not allow for the low angle bevel, then the core stiffened panel would have to be manufacturing using labor intensive and procedures (multiple cure cycles) that can also add significant weight penalties. In contrast, method 2901 of the present disclosure prevents the autoclave crushing of honeycomb core at any core bevel angle, while allowing the core stiffened structure to be cured in a single cure cycle.

Method 2901 includes a step 2903 of mixing and preparing the foam mixture. Step 2903 is substantially similar to step 407 described herein with regard to method 401. A step 2905 includes expanding the foam mixture in the desired honey comb cells.

Step 2907 includes trimming the expanded foam. A step 2909 includes assembling the composite skins with the honeycomb core member and curing in a cure cycle.

Referring now also to FIGS. 30-34, method 2901 is further described with regard to the manufacturing of core stiffened panel 3001. Core stiffened panel 3001 is illustrative of any variety of composite structures. For example, core stiffened panel 3001 can be a floor panel within fuselage 107 of rotorcraft 101. Core stiffened panel 3001 can include an upper composite skin 3003, a lower composite skin 3005, and a honeycomb core member 3007. The edge bevel portions 3011 of honeycomb core member 3007 are filled with expanded foam 3009 in order to provide the strength and stiffness to prevent deformation during the autoclave cure cycle. Edge bevel portions 3011 can be of any bevel angle B1 and are not limited to a bevel angle less than 27°. In the illustrated embodiment, bevel angle B1 is approximately 60°.

Figure 33:
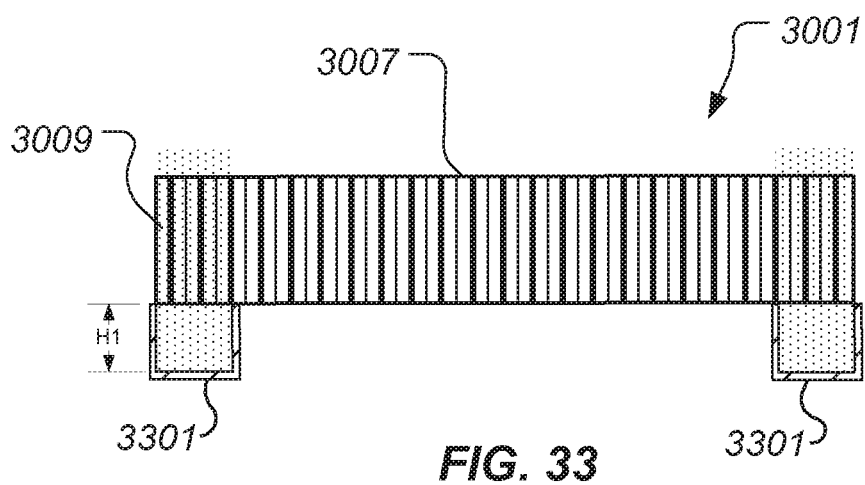
FIG. 33 is a cross-sectional stylized view of a method of stabilizing honeycomb core for an autoclave cure cycle of a core stiffened structure, according to an illustrative embodiment.

Step 2905 of method 2901 includes expanding the foam mixture in the desired honeycomb cells. Referring in particular to FIG. 33, step 2905 can be accomplished by pouring the foam mixture into a cavity tool 3301, then placing the stock honeycomb core on the cavity tool 3301 so that the foam mixture expands and fills the desired honeycomb cells that will be trimmed to the form the edge bevel portions 3011. In another embodiment, the foam mixture is poured into the cells. It should be appreciated that the edge bevel portions 3011 can be machined into the stock honeycomb core either before or after the foam mixture is expanded into the cells.

Step 2905 can also include tailoring the density of the expanded foam 3009 within honeycomb core member 3007. For example, the density of the expanded foam tends to decrease as a function of vertical height, as such, the height H1 of cavity tool 3301 can be chosen such that the density of the expanded foam 3009 within honeycomb core member 3007 is within a desired density range. By tailoring the density of expanded foam 3009, the strength and stiffness can be tailored based upon a variety of factors, such as autoclave pressure, edge bevel angle B1, honeycomb core material, to name a few. For example, it may be desirable to use a higher density of expanded foam where the edge bevel angle B1 is larger than an area where the edge bevel angle B1 is smaller.

Figure 34:
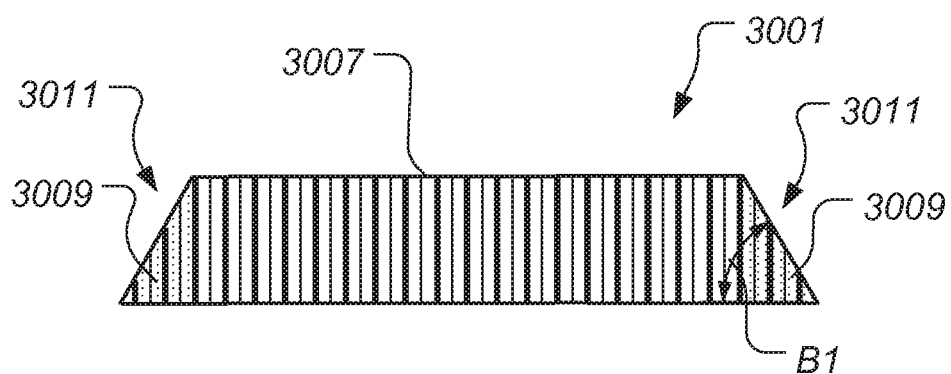
FIG. 34 is a cross-sectional stylized view of a method of stabilizing honeycomb core for an autoclave cure cycle of a core stiffened structure, according to an illustrative embodiment.

Step 2907 can include trimming the expanded foam 3009. Referring to FIG. 34, a fully trimmed honeycomb core member 3007 is illustrated. In the illustrated embodiment, the expanded foam 3009 is trimmed when the edge bevel portions 3011 are machined into the stock honeycomb core.

A step 2909 includes assembling the composite skins with the honeycomb core member and curing in a cure cycle. In the illustrated embodiment, upper skin 3003 and lower skin 3005 are cured after assembly in a single cure cycle involving autoclave pressure and heat.

The particular embodiments disclosed above are illustrative only, as the apparatuses and methods may be modified and practiced in different but equivalent manners apparent to those skilled in the art having the benefit of the teachings herein. Modifications, additions, or omissions may be made to the apparatuses described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A method of manufacturing a machined core member, the method comprising:
   providing a cavity having a first depth preselected to correlate with a first desired density of an expanded foam and having a second depth preselected to correlate with a second desired density of the expanded foam, the second depth being less than the first depth, and the second desired density being greater than the first desired density;
   pouring a foam mixture into the cavity and expanding the poured foam mixture to rise upwardly into cells of a stock core member and to become the expanded foam having both the first density and the second density extending laterally across the stock core member, the stock core member being arranged entirely over the cavity during said expanding, and the first and second densities of the foam within the stock core member corresponding to first and second cavity depth locations respectively; and
   machining the stock core member with the expanded foam in the cells.

2. The method according to claim 1, wherein the cells of the stock core member are hexagonal shaped.

3. The method according to claim 1, wherein the cells of the stock core member are square shaped.

4. The method according to claim 1, wherein the step of machining the stock core member is achieved with a contouring machine.

5. The method according to claim 1, further comprising:
   mixing a first resin component and a second resin component to form the foam mixture.

6. The method according to claim 1, further comprising:
   curing the expanded foam prior to the step of machining the stock core member.

7. The method according to claim 6, wherein the step of curing the expanded foam occurs at an ambient temperature without an artificial heat source.

8. The method according to claim 1, wherein the cells of the stock core member are made from a composite material.

9. The method according to claim 1, wherein the machined core member has an aerodynamic shape for implementation in a rotor blade and the expanded foam is located at a trailing edge of the rotor blade.

10. The method according to claim 9, wherein expanded foam having the second desired density is disposed where a bevel angle of the trailing edge is larger than a bevel angle of the trailing edge where expanded foam having the first desired density is disposed.

* * * * *